Nov. 16, 1965 W. PECHY 3,217,958
SOLDERING MACHINE
Filed March 8, 1963 3 Sheets-Sheet 2

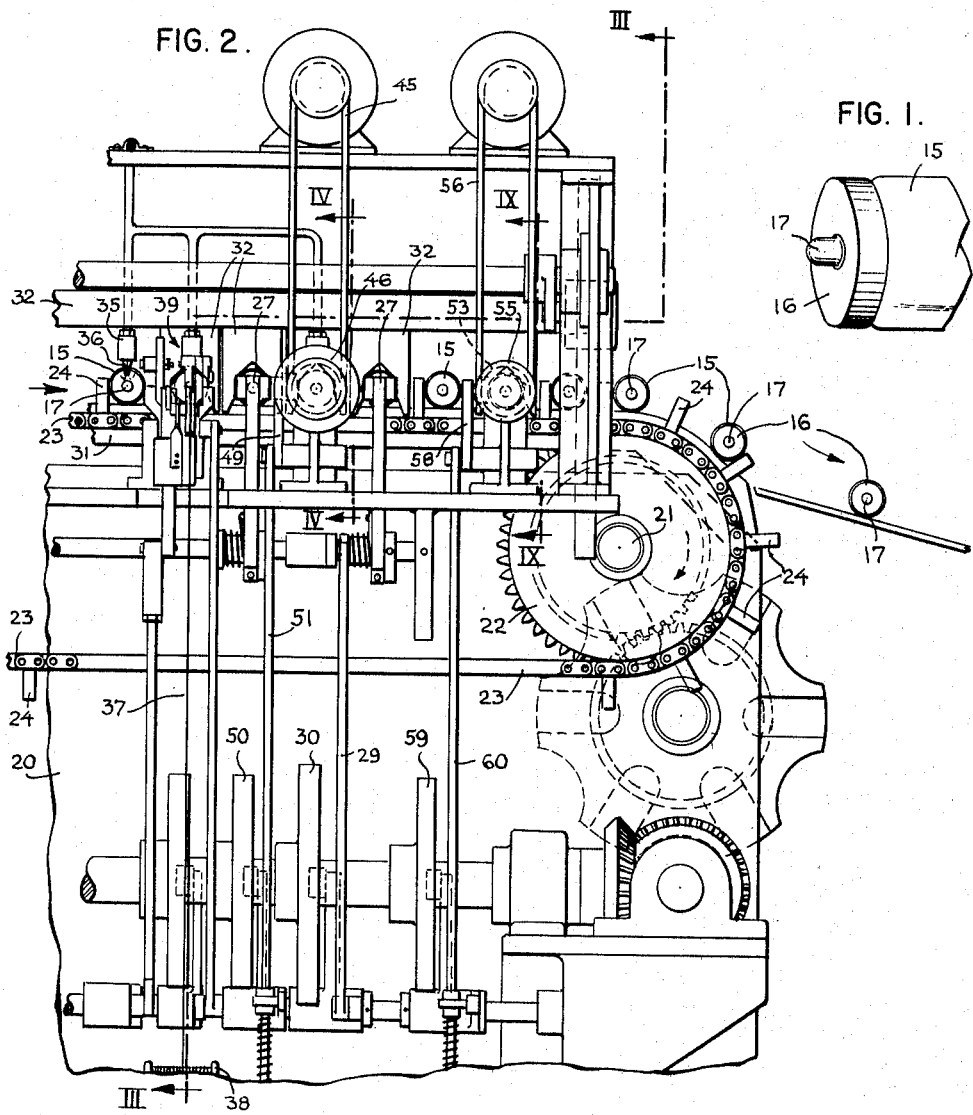

INVENTOR.
WILLIAM PECHY.
BY
W. D. Palmer
ATTORNEY.

Nov. 16, 1965
W. PECHY
3,217,958
SOLDERING MACHINE
Filed March 8, 1963
3 Sheets-Sheet 3
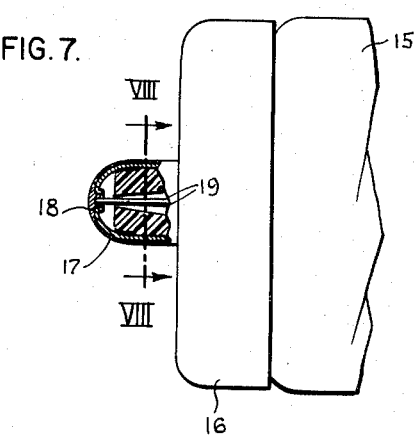
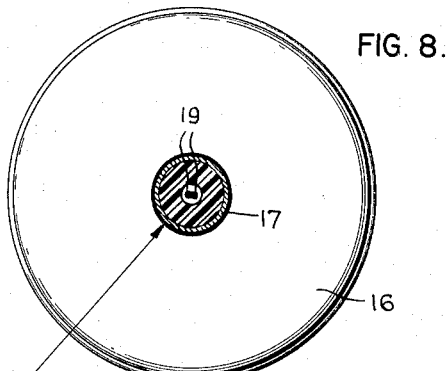
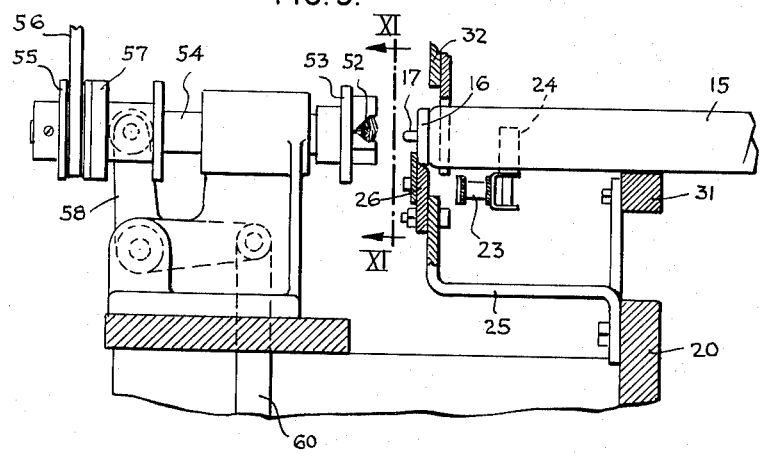
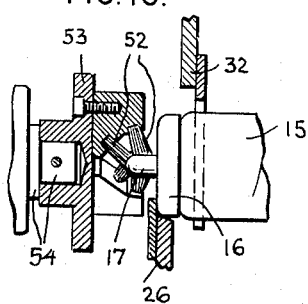
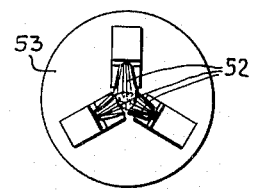
INVENTOR.
WILLIAM PECHY.
BY
W. D. Palmer
ATTORNEY.

United States Patent Office

3,217,958
Patented Nov. 16, 1965

3,217,958
SOLDERING MACHINE
William Pechy, Manasquan, N.J., assignor to Westinghouse Electric Corporation, Pittsburgh, Pa., a corporation of Pennsylvania
Filed Mar. 8, 1963, Ser. No. 263,871
11 Claims. (Cl. 228—19)

This invention relates to soldering machines, and more particularly to machines for automatically soldering lead-in wires in lamp terminals and in production of a novel construction of terminal.

In the manufacture of lamps and similar devices which employ prong type of terminals, it is usual practice to fabricate the terminals from tubular stock with a rounded outer end of dome shape but with a hole at the crest of the dome through which lead-in wires protrude initially though ultimately cropped off and soldered in the terminal. Often the rough ends of the wires protrude through the solder and the soldering on successive lamps is not always the same which presents the probability that the prongs are not always of equal length.

Broadly considered, the present invention is directed to a machine to automatically perform the soldering operation and to produce uniform character of terminals for lamps and the like.

Likewise broadly considered, the invention proposes recreating full dome shape to the terminal and simultaneously with soldering of the lead-in wires in the terminals.

A further broad aspect of the invention is to assure complete burying of the lead-in wires to positively prevent any protrusion thereof from the dome-shaped end of the complete terminal.

More specifically, an object of the invention is to apply pressure to the molten solder to assure its penetration into the hole of the terminal end around the lead-in wire or wires.

Again, a specific object of the invention is to utilize a spinning operating on the molten solder for attainment of full dome shape devoid of burrs for the terminal end.

As a corollary objective to the foregoing one, the invention proposes coating the entire exterior of the terminal with solder for assuring not only uniform appearance, but assuring the more important result of uniform electrical conductivity.

The invention furthermore includes provision for effecting a final cleaning or brushing and polishing of the solder-covered terminal.

Other objects, advantages, beneficial results and structural features will appear to persons skilled in the art to which the invention appertains as the description proceeds, both by direct mention thereof and by implication from the context.

Before entering into a detailed description of the arbitrarily selected disclosure of machine embodying the invention, let it be said that there are numerous devices, such as fluorescent and other lamps, radio tubes, condensers, transformers, and so forth, that employ prong type of terminals, and while the drawings show specific use with respect to fluorescent lamps, the invention is not restricted thereto.

Referring to the accompanying drawings, in which like numerals of reference indicate similar parts throughout the several views;

FIGURE 1 is a perspective view of an end portion of a fluorescent lamp with a base having a single prong type of terminal;

FIGURE 2 is an elevational view of an end portion of a conveyor type of machine, looking at what may be termed the front thereof, and showing relative locations of preheat, soldering, spinning, polishing and discharge positions or stations through which the terminal passes in its attached condition to the lamp or other device.

Figure 4:
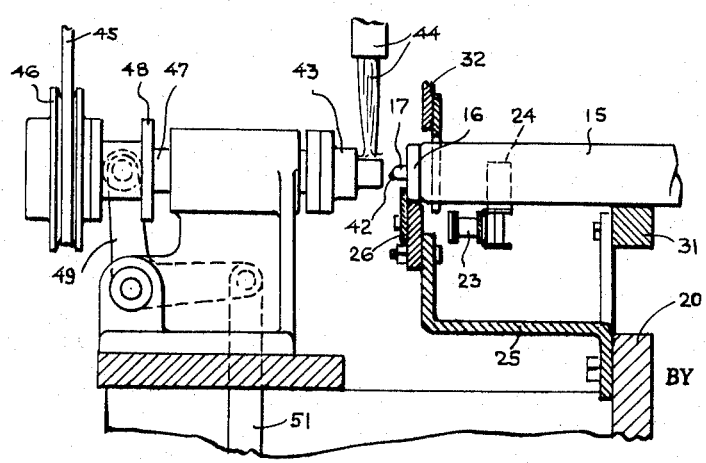
FIGURE 4 is a cross-sectional view on line IV—IV of FIGURE 2, showing the longitudinal movable and rotating soldering iron in its relation preparatory to application to the terminal.

FIGURE 5, sheet 1, is an enlarged view of the portion of FIGURE 4 showing the soldering iron and terminal, and showing the same in section ready for engagement;

FIGURE 6 is a view corresponding to FIGURE 5, showing the soldering iron advanced in operative engagement with the terminal;

FIGURE 7 is a longitudinal sectional view of the coated terminal on a lamp cap or base;

FIGURE 8 is a cross section of the finished terminal on line VIII—VIII of FIGURE 7;

FIGURE 9 is a cross section on line IX—IX of FIGURE 2, showing the lamp terminal in longitudinal opposition to rotatable brushes;

FIGURE 10 is a similar enlarged though less extensive sectional view as in FIGURE 9, but with the brushes advanced into contact with the terminal; and FIGURE 11 is an end view of the brush head looking toward the brushes mounted therein.

Preliminary to the several steps performed upon the terminal according to the present invention, said terminal has previously had the internal lead-in wires cut off at their otherwise protruding ends, and both the wires and the crest of the terminal end ground back, forming a plateau on the end of said terminal. It is in this condition that the terminal is presented for the finishing operations involved in the present invention. As will appear more in detail in the following description, the lamps or other devices are introduced into the machine in spaced parallelism to each other, and are advanced with a step-by-step motion, referred to in the trade as being indexed. Between the periods of forward transition of the lamps or the like, there is a period of rest, and it is at periods of rest for each lamp that the several operations of the present invention are performed. With respect to any one lamp, different operations are performed at different positions of rest, herein referred to as successive stations, but by that term it is not necessarily implied that the stations of operation are located at every position of rest, as the succession of stations may follow even though there is an intervening position of rest.

Entering now upon a specific description of the arbitrarily selected embodiment of the invention illustrated in said drawings, a lamp 15 of slim tubular fluorescent type with a cap or base 16 cemented on an end thereof is shown having a centrally located contact element or terminal 17 projecting coaxially outwardly from the said base, said terminal constitutes the workpiece of primary interest to this disclosure. As previously indicated, the terminal has a plateau 18 at its end which otherwise is of dome shape with a hole centrally of the plateau at which the cropped end of a lead-in wire 19 appears (or lead-in wires 19 appear) but without protrusion beyond said plateau.

The machine provides an appropriate frame 20 across which is mounted a sprocket shaft 21 having two parallel sprockets 22 thereon spaced apart a distance less than the length of the lamps so that chains 23 on said sprockets and extending to like sprockets at the other end of the machine may be utilized conveniently for feeding the lamps successively in parallelism to each other in a forward direction transverse to the axes of the lamps. The chains 23 are provided with upstanding dividers 24 between which the lamps are placed for effecting the forward parallel transition of the lamps from entry end to discharge end of the machine. The mechanism specifically involved in the present invention is shown proximate to the discharge end of the machine. This general construction of chain drive in lamp machines is known in the prior art so that more detail description is not deemed necessary. The chains 23 are advanced by a step-by-step motion, known as indexing, from a suitable or well-known drive (not shown) advancing the lamps a step at a time and providing periods of rest or non-advancement intervening between each step of advancement. At certain of these positions of rest, there are successive stations of operation on the work piece, in the order of preheating, soldering, spinning and brushing or polishing.

During at least most of the aforementioned operations on the work piece, it is essential that said work piece be held or clamped in a fixed position. For this purpose, at the side of the machine at which the work piece under consideration is located, there is a fixed bracket 25 extending from the frame 20 toward the end of the lamp, mounting a stop 26 which projects in flatwise opposition to the end of cap or base 16. At the other side of the machine and end of the lamp there is a pusher 27 which functions to slide the lamp longitudinally until said end of the cap or base engages stop 26. The pusher is indicated as one arm of a bell-crank lever 28 the other arm of which is swung by a link 29 thereto which is under control of a cam 30 and obtains the pushing operation at what may be termed, for purposes of this description, a first or initial station and position of rest for the work piece. The lamp is thereby pushed longitudinally until stopped by said stop, and is then clamped in the position to which it is pushed, the clamping being made intermittently effective until the lamp has completed its transition through the remaining operations thereon.

Figure 3:
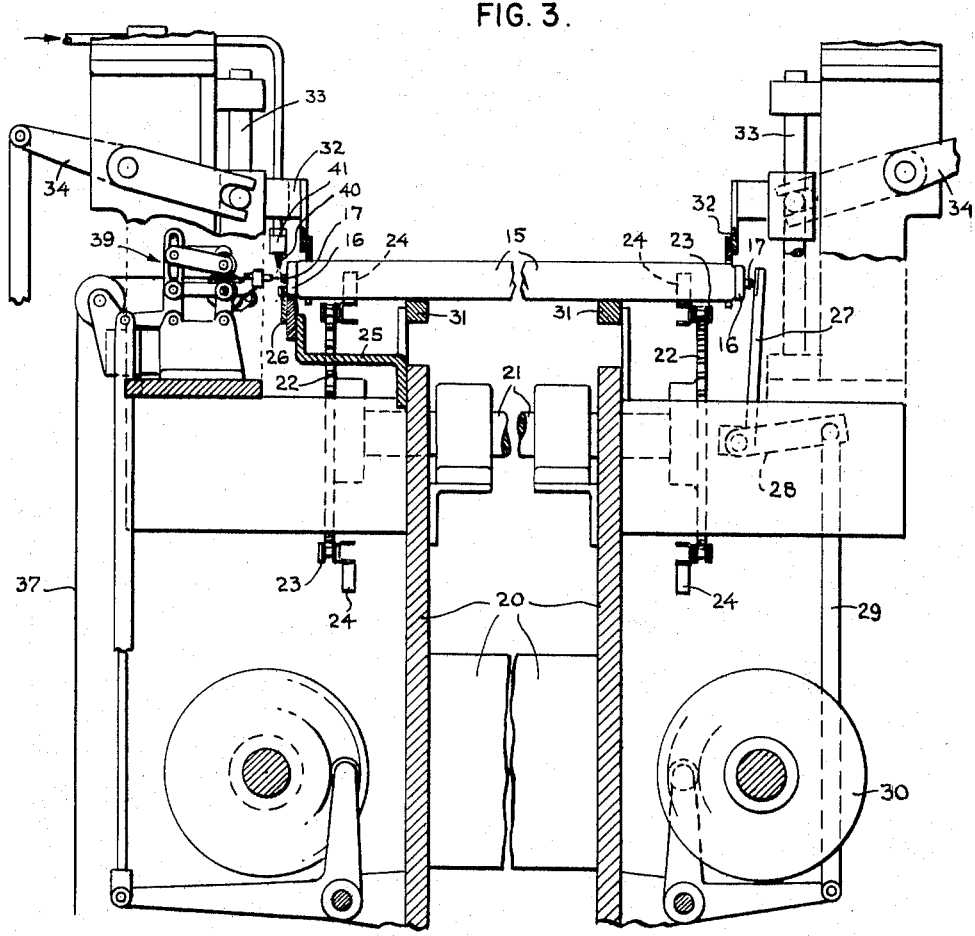
FIGURE 3 is a cross-sectional view on line III—III of FIGURE 2, showing a fluorescent lamp in clamped position and with its terminal aligned with solder wire for application thereto.

Preferably clamping of the lamp is effected near both ends of the same, as shown in FIGURE 3. The particular clamping means chosen for illustration herein comprises a skid 31 fixed with respect to the frame 20 and which is slightly higher than the resting surface for the lamp on the feed chain 23 so as to eliminate influence of wobble of the chain. A clamping jaw 32 vertically movable on a track 33 is operated under control of a lever 34 likewise suitably cam driven. After the lamp is pushed into its longitudinal position against stop 26, clamping jaws 32 are brought down into clamping engagement therewith. After operation at each station is completed, the jaws are released so the lamp may be moved to the next station at which the jaws are again clamped on the lamp, and so on for the several operations performed on the work piece.

At a preliminary station, preferably the one immediately prior to the aforesaid initial station where the lamp is pushed to longitudinal position, there is located above the path of transition of the work piece, a burner 35 the flame 36 from which will play upon and preheat the work piece or terminal 17. It is preferred that this preheating take place before the terminal arrives at the stop 26 so as to avoid application of constant flame against said stop. In order to save on the number of steps or stations required, the longitudinal location of the lamp against stop 26 and application of solder to the terminal may be performed at a single station, and in this description is referred to as the initial station. The mechanism for applying the solder may be in accordance with prior art usage, and in essence comprises feeding solder wire 37 from its storage spool 38 to the hole in the end of the terminal in a direction longitudinally of said terminal, by a well-known ratchet advancing mechanism 39. The drive supplies solder and flux to the terminal in proper amount, equal for each terminal, and as it is supplied longitudinally of the terminal and heated on approach thereto by flame 40 of a burner 41 it tends to be forced into the hole of the terminal and also forms a gob 42 on the plateau end of the terminal.

At a subsequent station after the gob of solder has been applied to the terminal, the end of the lamp is located in axial alignment with a longitudinally movable and rotating hollow soldering iron 43 which is kept hot by the flame from a burner 44. The interior hollow of this soldering iron is of female dome shape of appropriate size to loosely fit over the end of the terminal, and preferably deep enough to receive substantially the entire terminal therein. Said soldering iron is continuously rotating under actuation by belt drive 45 to pulley 46 on a common shaft 47 with the pulley and soldering iron. A shift collar 48 is fixed on said shaft controlled by a shift lever 49 in turn under influence of a cam 50 interconnected by a link 51, so that the soldering iron may be applied onto the terminal to completely enclose the same and at the same time spin rapidly in its coaxial position around the terminal. The longitudinal movement of the soldering iron in full telescoped position on the terminal tends to force the gob of solder to a deeper depth into the terminal and also tends to spread the solder at the outside of the terminal surface from end to end thereof as well as to fill out the full dome shape over the plateau of the terminal. The spinning of the soldering iron effects complete spreading of the solder throughout the terminal surface. Consequently, in use of the terminal, no matter where electrical contact may be made to the terminal it will be made against the solder coating and good conductivity thereby assured. Of course, after the spinning operation is completed, the soldering iron is retracted thereby freeing the work piece therefrom and permitting the lamp to be continued in its forward transit to its next station.

The final station for the lamp before its discharge from the machine according to the present showing, is one at which brushes 52 with stiff bristles are swept over the outer surface of the solder-coated terminal. Appropriately arranged and directed brushes 52 are shown in FIGURES 10 and 11 carried in a circular hollow head 53 supported and operated in like manner as above described for the soldering iron. Accordingly said brush head is on a common shaft 54 with a pulley 55 driven by a belt 56 to be in constant rotation. The shaft is movable longitudinally toward the lamp terminal by a shift collar 57 fast with respect to the shaft controlled by a shift lever 58 in turn under influence of a cam 59 interconnected by a link 60. The brushes clean, smooth and polish the solder surface on the terminal which now has a perfect dome shape and will present throughout its entire area a perfect electrical contact surface. The brush-head and its brushes will then be retracted from the terminal, and the lamp permitted to discharge from the machine as the chain drive continues in its forward operation.

Fluorescent lamps and some other devices of like character have prong terminals at both ends. While the devices might be turned end for end and passed through the machine a second time to operate upon the terminals of said other ends, it is more economical both as to time and labor, to operate upon the terminals at both ends during a single passage of the device through the machine. This merely means that the devices above described are duplicated at the opposite side of the machine, and in making such duplication an operation may be first performed at one end at a first station and the same operation next performed at a second station on the opposite end of the device, and then at the next or third station a second operation is performed at the initially treated end, and so on alternately. This alternate treatment at opposite ends of the lamp is contemplated by the present showing, particularly FIGURE 2, where intervening stations appear between the described stations, but without including the instrumentalities for the duplicate operations so as not to further complicate the showing in the drawings.

A machine for grinding the lead-in wire and dome-shaped terminal, prior to soldering in accordance with the present invention, is disclosed in copending application S.N. 263,872, filed concurrently herewith, titled "Grinding Machine," now Patent No. 3,159,948, and assigned to the present assignee.

It will be recognized that the objects of the invention have been achieved by providing a machine for automatically performing a soldering operation for the terminal of a lamp. There has also been provided an improved lamp terminal.

While a best embodiment of the invention has been illustrated and described in detail, it is to be particularly understood that the invention is not limited thereto or thereby.

I claim:

1. A soldering machine for prong terminals one of which projects from each of the ends of elongated lamps and like devices, said machine comprising:
    (a) indexing means for successively indexing said devices to and from a plurality of work stations, with said devices resting at each of said work stations between index motions, and with said terminal at each end of said devices projecting in a common direction when each said device is at rest at any one of said work stations;
    (b) solder applying means positioned at an initial work station into which said devices are successively indexed, said solder applying means operable to apply solder onto the end of at least one of said terminals which project from each end of said devices when they are at rest at said initial work station; and
    (c) solder shaping means positioned at a later work station into which said devices are later successively indexed, and said solder shaping means operable to shape the previously applied solder on said terminals into the form of a dome about the surface of said terminals with the greatest thickness of solder at the crest of the formed dome.

2. The machine as specified in claim 1, wherein said solder shaping means is longitudinally reciprocable to move into contact with said terminals to shape said solder.

3. The soldering machine as specified in claim 1, wherein said solder shaping means is rotatable with respect to said terminals.

4. The machine as specified in claim 1, wherein said solder shaping means is longitudinally reciprocable to move into contact with said terminals and is also rotatable with respect to said terminals to shape said solder.

5. A soldering machine for prong terminals one of which projects from each of the ends of elongated lamps and like devices, wherein each of said terminals have approximately dome-shaped ends with plateaus at the crests of the dome shape and with each plateau having a hole therethrough, said machine comprising:
    (a) indexing means for successively indexing said devices to and from a plurality of work stations, with said devices resting at each of said work stations between index motions, and with said terminal at each end of said devices projecting in a common direction when each said device is at rest at any one of said work stations;
    (b) solder applying means positioned at an initial work station into which said devices are successively indexed, said solder applying means operable to apply solder onto the plateau end of at least one of said terminals which project from each end of said devices when they are at rest at said initial work station;
    (c) solder shaping means formed as an iron having a hollow providing a female full dome shape positioned at a later work station into which said devices are later successively indexed; and
    (d) means for advancing said solder shaping means longitudinally and axially with respect to said solder-carrying terminals and over the ends of said solder-carrying terminals for forcing solder into the said holes thereof.

6. The soldering machine as specified in claim 5, wherein said solder shaping means is spun and then telescoped over the solder-carrying terminals to provide a solder coating of full dome shape over substantially the entire terminal surface.

7. The soldering machine as specified in claim 6, wherein polishing means is positioned at a still-later station to polish said applied solder coating.

8. The soldering machine as specified in claim 7, wherein said polishing means is both rotatable and longitudinally movable into operative relationship with respect to solder-carrying terminals resting at said still-later station.

9. The soldering machine as specified in claim 8, wherein said rotatable polishing means is a brush.

10. A soldering machine for prong terminals one of which projects from each of the ends of elongated lamps and like devices, said machine comprising:
    (a) indexing means for successively indexing said devices to and from a plurality of work stations, with said devices resting at each of said work stations between index motions, and with said terminal at each end of said devices projecting in a common direction when each said device is at rest at any one of said work stations;
    (b) solder applying means positioned at an initial work station into which said devices are successively indexed, said solder applying means operable to apply solder onto the end of each of the terminals which project from each end of said devices when they are at rest at said initial work station; and
    (c) solder shaping means positioned at a later work station into which said devices are later successively indexed, and said solder shaping means operable to shape the previously applied solder on said terminals into the form of a dome about the surface of said terminals with the greatest thickness of solder at the crest of the formed dome.

11. A soldering machine for the prong terminal which projects from at least one end of elongated lamps and like devices, said machine comprising:
    (a) indexing means for successively indexing said devices to and from a plurality of work stations, with said devices resting at each of said work stations between index motions, and with each said terminal of said devices projecting in a common direction when each said device is at rest at any one of said work stations;
    (b) solder applying means positioned at an initial work station into which said devices are successively indexed, said solder applying means operable to apply solder onto the end of each said terminal of said devices when they are at rest at said initial work station; and
    (c) solder shaping means positioned at a later work station into which said devices are later successively indexed, and said solder shaping means operable to shape the previously applied solder on said terminals into the form of a dome about the surface of said terminals with the greatest thickness of solder at the crest of the formed dome.

References Cited by the Examiner

UNITED STATES PATENTS

| | | | |
|---|---|---|---|
| 1,702,234 | 2/1929 | Goodridge | 339—275 |
| 2,429,287 | 10/1947 | McGowan et al. | 113—133 |
| 2,685,268 | 8/1954 | Yeo et al. | 113—94 |
| 2,715,216 | 8/1955 | Howenstine | 339—257 |
| 2,733,419 | 1/1956 | Beck | 29—155.55 |
| 3,025,593 | 3/1962 | Mueller | 29—203 |
| 3,037,268 | 6/1962 | Mitchell et al. | 29—203 |

FOREIGN PATENTS 987,051  4/1921  France.

WHITMORE A. WILTZ, *Primary Examiner.*

THOMAS J. HICKEY, CHARLES W. LANHAM,
*Examiners.*